(12) United States Patent
Sitterlet

(10) Patent No.: US 10,414,378 B2
(45) Date of Patent: Sep. 17, 2019

(54) WINDOW ASSEMBLY

(71) Applicant: Pilkington Group Limited, St. Helens, Merseyside (GB)

(72) Inventor: Charles Sitterlet, Northwood, OH (US)

(73) Assignee: Pilkington Group Limited, St. Helens (GB)

( * ) Notice: Subject to any disclaimer, the term of this patent is extended or adjusted under 35 U.S.C. 154(b) by 490 days.

(21) Appl. No.: 14/321,276

(22) Filed: Jul. 1, 2014

(65) Prior Publication Data

US 2016/0001744 A1 Jan. 7, 2016
US 2016/0107613 A9 Apr. 21, 2016

Related U.S. Application Data

(60) Provisional application No. 61/841,993, filed on Jul. 2, 2013.

(51) Int. Cl.
*H05B 3/03* (2006.01)
*H05B 3/86* (2006.01)
*B60S 1/02* (2006.01)
*H05B 3/84* (2006.01)
*H01R 4/18* (2006.01)

(52) U.S. Cl.
CPC ............ *B60S 1/026* (2013.01); *H05B 3/84* (2013.01); *H05B 3/86* (2013.01); *H01R 4/182* (2013.01); *H05B 2203/013* (2013.01); *H05B 2203/016* (2013.01); *H05B 2203/031* (2013.01)

(58) Field of Classification Search
None
See application file for complete search history.

(56) References Cited

U.S. PATENT DOCUMENTS 5,877,473 A 3/1999 Koontz
6,011,244 A 1/2000 Castle et al.
(Continued)

FOREIGN PATENT DOCUMENTS

JP H1-36336 Y2 * 11/1989
JP 2013154840 A 8/2013
(Continued)

OTHER PUBLICATIONS

JP H1-36336Y2, Watanabe, Nov. 1989, partial translation.*
JP 2013-173476 A, Nakagawa, 09-22013, "Window Glass with Seal Member," partial translation.*

*Primary Examiner* — Joseph M Pelham
(74) *Attorney, Agent, or Firm* — Marshall & Melhorn, LLC

(57) ABSTRACT

A window assembly includes a polymeric interlayer provided between an inner pane of glass and an outer pane of glass. The inner pane and outer pane each have a first major surface and a second major surface. The second major surface of the outer pane and the first major surface of the inner pane face each other. The window assembly also includes a connector assembly. The connector assembly has a wire assembly. The wire assembly has a terminal connector. The terminal connector has a width and a height. The width is greater than the height. The terminal connector is attached to a busbar provided on the second major surface of either the inner pane or the outer pane. A potting layer is provided over the terminal connector. The potting layer separates the terminal connector from an electrically conductive portion of a vehicle adjacent thereto.

25 Claims, 4 Drawing Sheets

(56) References Cited

U.S. PATENT DOCUMENTS

| | | | |
|---|---|---|---|
| 6,137,086 A | 10/2000 | Williams, Jr. | |
| 6,791,065 B2 * | 9/2004 | Bartrug | B32B 3/10 |
| | | | 219/203 |
| 6,906,287 B2 | 6/2005 | Sol | |
| 6,995,339 B2 | 2/2006 | Schwartz et al. | |
| 7,180,031 B1 * | 2/2007 | Loibl | H05B 1/0227 |
| | | | 174/68.1 |
| 8,431,869 B2 | 4/2013 | Raghavan et al. | |
| 9,006,613 B2 | 4/2015 | Sakamoto et al. | |
| 9,837,727 B2 * | 12/2017 | Schmalbuch | H01R 12/53 |
| 2003/0042239 A1 * | 3/2003 | Sol | B32B 17/10036 |
| | | | 219/203 |
| 2003/0080103 A1 * | 5/2003 | Hamel | F23Q 7/22 |
| | | | 219/270 |
| 2004/0084432 A1 * | 5/2004 | Schwartz | B60S 1/048 |
| | | | 219/203 |
| 2009/0277671 A1 * | 11/2009 | Hahn | B32B 17/10036 |
| | | | 174/257 |
| 2014/0332519 A1 * | 11/2014 | Sakamoto | B60J 1/02 |
| | | | 219/203 |
| 2014/0374401 A1 | 12/2014 | Nakagawa | |
| 2015/0189701 A1 | 7/2015 | Sakamoto et al. | |
| 2015/0236431 A1 * | 8/2015 | Schmalbuch | H01R 4/187 |
| | | | 174/252 |

FOREIGN PATENT DOCUMENTS

| | | | | |
|---|---|---|---|---|
| JP | 2013173476 A | * | 9/2013 | ............ B01J 10/70 |
| JP | 2015003602 A | | 1/2015 | |
| WO | 2013128796 A1 | | 9/2013 | |

* cited by examiner

WINDOW ASSEMBLY

CROSS-REFERENCE TO RELATED APPLICATION

This application is claiming the benefit, under 35 U.S. C. 119(e), of the provisional application which was granted Ser. No. 61/841,993 filed on Jul. 2, 2013, the entire disclosure of which is hereby incorporated by reference.

BACKGROUND OF THE INVENTION

The invention relates to a window assembly. More particularly, the invention relates to a window assembly with a heated wiper rest area.

The windows of a vehicle are a prominent feature of the overall design of the vehicle. Increasingly, the front window or windshield is a location on which an ever-expanding variety of electronic equipment and other devices are disposed. Typically, electricity must be reliably supplied to the equipment and devices disposed on the windshield to power the aforementioned items. As such, there is often a balance that must be achieved between the appearance of the windshield and ensuring that the items disposed thereon will operate without failure.

Thus, it would be desirable to provide a windshield which allows electrical power to be supplied to, for example, a heated wiper rest area and has a modern, pleasing appearance.

BRIEF SUMMARY OF THE INVENTION

In an embodiment, a window assembly is provided. The window assembly comprises a polymeric interlayer provided between an inner pane of glass and an outer pane of glass. The inner pane and outer pane each have a first major surface and a second major surface. The second major surface of the outer pane and the first major surface of the inner pane face each other. The window assembly also comprises a connector assembly. The connector assembly has a wire assembly. The wire assembly comprises a terminal connector. The terminal connector has a width and a height. The width is greater than the height. The terminal connector is attached to a busbar provided on the second major surface of either the inner pane or the outer pane. A potting layer is provided over the terminal connector. The potting layer separates the terminal connector from an electrically conductive portion of a vehicle adjacent thereto.

In another embodiment, the window assembly comprises a polymeric interlayer provided between an inner pane of glass and an outer pane of glass. The inner pane and outer pane each have a first major surface and a second major surface. The second major surface of the outer pane and the first major surface of the inner pane face each other. The window assembly also comprises a connector assembly. The connector assembly has a wire assembly. The wire assembly comprises a terminal connector. The terminal connector is attached to a busbar provided on the second major surface of the outer pane. A potting layer is provided over the terminal connector. The potting layer forms an inboard surface which does not extend beyond the second major surface of the inner pane.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
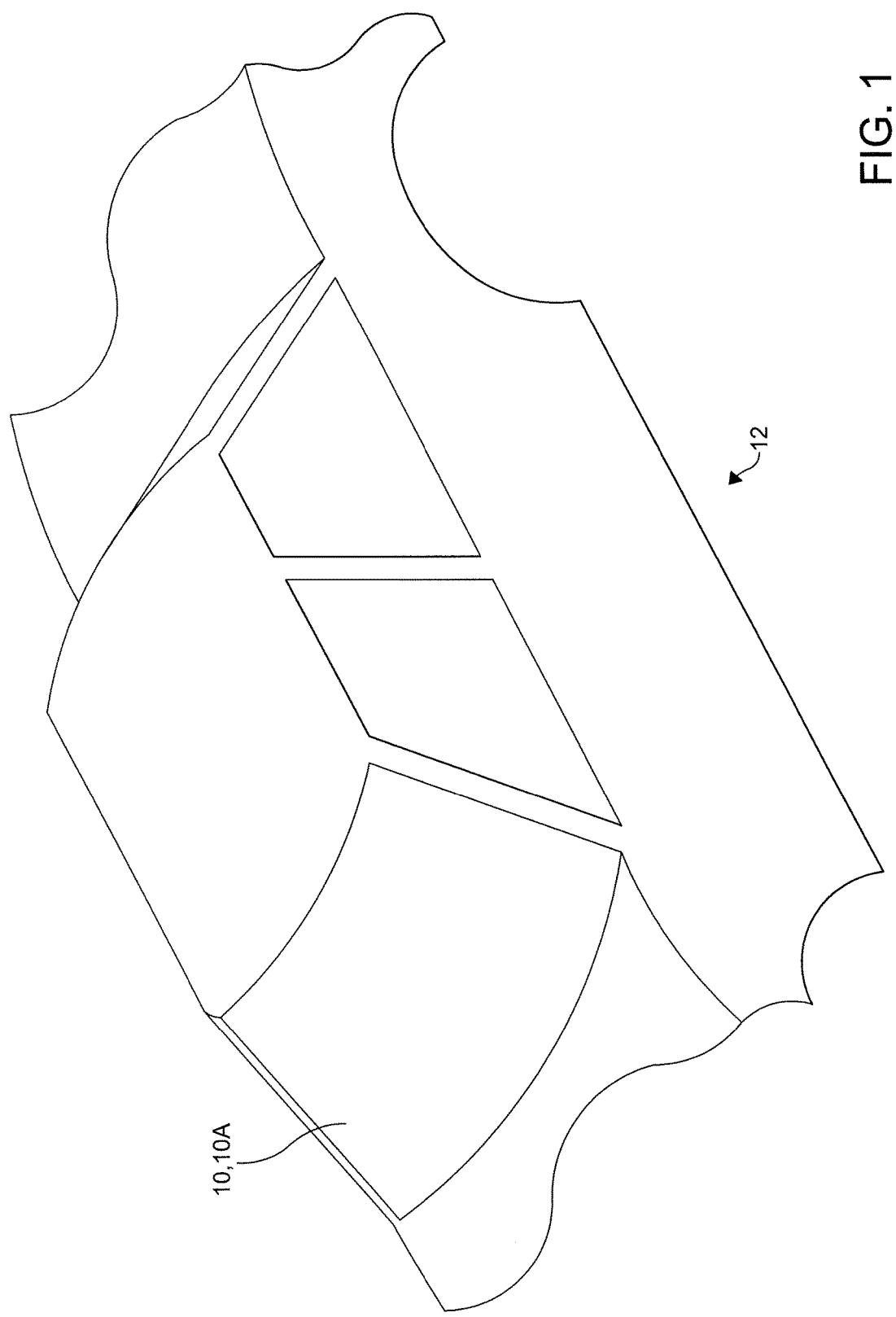
FIG. 1 is a partial perspective view of a vehicle depicting a window assembly in accordance with the invention.

It is to be understood that the invention may assume various alternative orientations and step sequences, except where expressly specified to the contrary. It is also to be understood that the specific articles, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Referring now to the figures, there is illustrated in FIG. 1 a window assembly 10, 10A. The window assembly 10, 10A will be described in connection with a vehicle 12. It would be understood by one of ordinary skill in the art that the assembly described herein may have applications to on-highway and off-highway vehicles. Furthermore, it would be understood by one of ordinary skill in the art that the present invention could have industrial, locomotive, naval and aerospace applications.

The window assembly 10, 10A may be installed in any appropriate body opening of the vehicle 12. It is preferred that the window assembly 10, 10A is installed in a body opening 32 so as to be the front window or windshield of the vehicle 12. However, it should be appreciated that the window assembly could be utilized in another body opening in the vehicle such as, for example, in a side or rear opening of the vehicle.

The window assembly 10, 10A comprises a polymeric interlayer 14 provided between an inner pane of glass 16 and an outer pane of glass 18. Preferably, the polymeric interlayer 14 is substantially transparent to visible light. The polymeric interlayer 14 is of or includes a suitable polymer such as, for example, polyvinyl butyral (PVB) or another polymer. In certain embodiments like the one shown in FIG. 7, the polymeric interlayer 14 is provided as a sheet of material in a shape substantially matched to that of the inner pane 16 and outer pane 18. In other embodiments like the one shown in FIG. 6, the polymeric interlayer 14 is provided in a shape substantially matched to that of the inner pane 16.

To form the window assembly 10, 10A, the inner pane 16 and outer pane 18 are laminated to each other or are otherwise adhered together via the polymeric interlayer 14. Lamination processes known in the art are suitable for adhering the inner pane 16 to the outer pane 18 via the polymeric interlayer 14 and forming the window assembly 10, 10A. Generally, such lamination processes will include inserting the polymeric interlayer 14 between the inner pane 16 and the outer pane 18 and subjecting the interlayer 14 and panes 16, 18 to a predetermined temperature and pressure to create a laminated window assembly 10, 10A. After lamination, it is preferred that the combined thickness of the polymeric interlayer 14 and the inner pane 16 is 2.7 mm or less. More preferably, the combined thickness of the polymeric interlayer 14 and the inner pane 16 is 2.5 mm or less after lamination.

The inner pane 16 and outer pane 18 each have a peripheral edge that defines a peripheral edge 30 of the window assembly 10, 10A. The inner pane 16 and outer pane 18 each have a first major surface 20, 21 and a second major surface 22, 23. Preferably, the first major surface 21 of the outer pane 18 faces the exterior environment, the second major surface 22 of the inner pane faces the interior of the vehicle 12 and the second major surface 23 of the outer pane 18 and the first major surface 20 of the inner pane 16 face each other.

When installed, the window assembly 10, 10A is proximate a windshield wiper system (not depicted). The windshield wiper system comprises one or more windshield wipers which clean the window assembly 10, 10A and remove moisture from the assembly to allow the driver of the vehicle to clearly view the roadway ahead. Under certain conditions, the windshield wipers help to keep the window assembly 10, 10A free from ice, slush, and the like. However, under conditions where ice, slush and the like may form, the windshield wipers are susceptible to freezing to the first major surface 21 of the outer pane 18 while in a rest position. Thus, it has been found to be desirable to heat a portion of the window assembly 10, 10A where the wipers rest to prevent the wipers from freezing thereto when the wipers are at rest. Also, it has been found to be desirable to heat portions of the window assembly 10, 10A where the wipers deposit ice, slush, and the like after removing the aforementioned from obstructing the view of the driver. The aforementioned portions 24 of the window assembly 10, 10A which are desirable to heat will be referred to hereinafter as the "wiper rest area."

The wiper rest area 24 is provided on the first major surface 21 of the outer pane 18 and in one or more edge portions 26, 26A, 28 of the window assembly 10, 10A so that when the wipers are at rest or when ice, slush or the like is deposited the driver's view is only minimally obstructed. For example, the wiper rest area 24 may comprise a lower edge portion 26, 26A or a side edge portion 28 of the window assembly 10, 10A. Preferably, the wiper rest area 24 comprises the side edge portion 28 of the window assembly 10, 10A adjacent the driver's side of the vehicle. In another embodiment, the wiper rest area 24 comprises a plurality of edge portions 26, 26A, 28 of the window assembly 10, 10A. For example, the wiper rest area 24 may comprise the lower edge portion 26, 26A and side edge portion 28 of the window assembly 10, 10A.

Heating of the wiper rest area 24 can be accomplished by any suitable method. An example of a suitable method for heating the wiper rest area is described in U.S. Pat. No. 6,137,086, which is incorporated by reference herein in its entirety. However, it is preferred that heating of the wiper rest area 24 is accomplished by electrical resistance heating. The wiper rest area 24 can be heated by providing electrical resistance heating on any of the major surfaces 20, 21, 22, 23 of the inner pane 16 or the outer pane 18. However, as illustrated best in FIGS. 6 and 7, it is preferred to heat the wiper rest area 24 by providing electrical resistance heating on the second major surface 22, 23 of the of the inner pane 16 or the outer pane 18.

Preferably, electrical resistance heating of the wiper rest area 24 is achieved by providing one or more electrically conductive traces 36 adjacent the wiper rest area 24. The conductive traces 36 are provided on one of the major surfaces 20, 21, 22, 23 of the inner pane 16 or the outer pane 18 and extend along one or more edge portions 37, 38 of either the inner pane 16 or the outer pane 18. For example, the conductive traces 36 may extend along a lower edge portion 37 of the inner pane 16 or the outer pane 18 or along a driver's side edge portion 38 of the inner pane 16 or the outer pane 18. Preferably, the conductive traces 36 extend along both the lower edge portion 37 and driver's side edge portion 38 of the inner pane 16 or the outer pane 18.

The conductive traces 36 can be formed by a printing process. However, other processes may be utilized to form the conductive traces 36 and are suitable for use in forming the window assembly 10, 10A. Such processes include deletion, sputtering or silk-screening processes or the like. The conductive traces 36 can be formed from any material which promotes electrical conductance and has an electrical resistance so as to generate heat. For example, the conductive traces 36 may be formed from a silver-containing ceramic frit.

Figure 2:
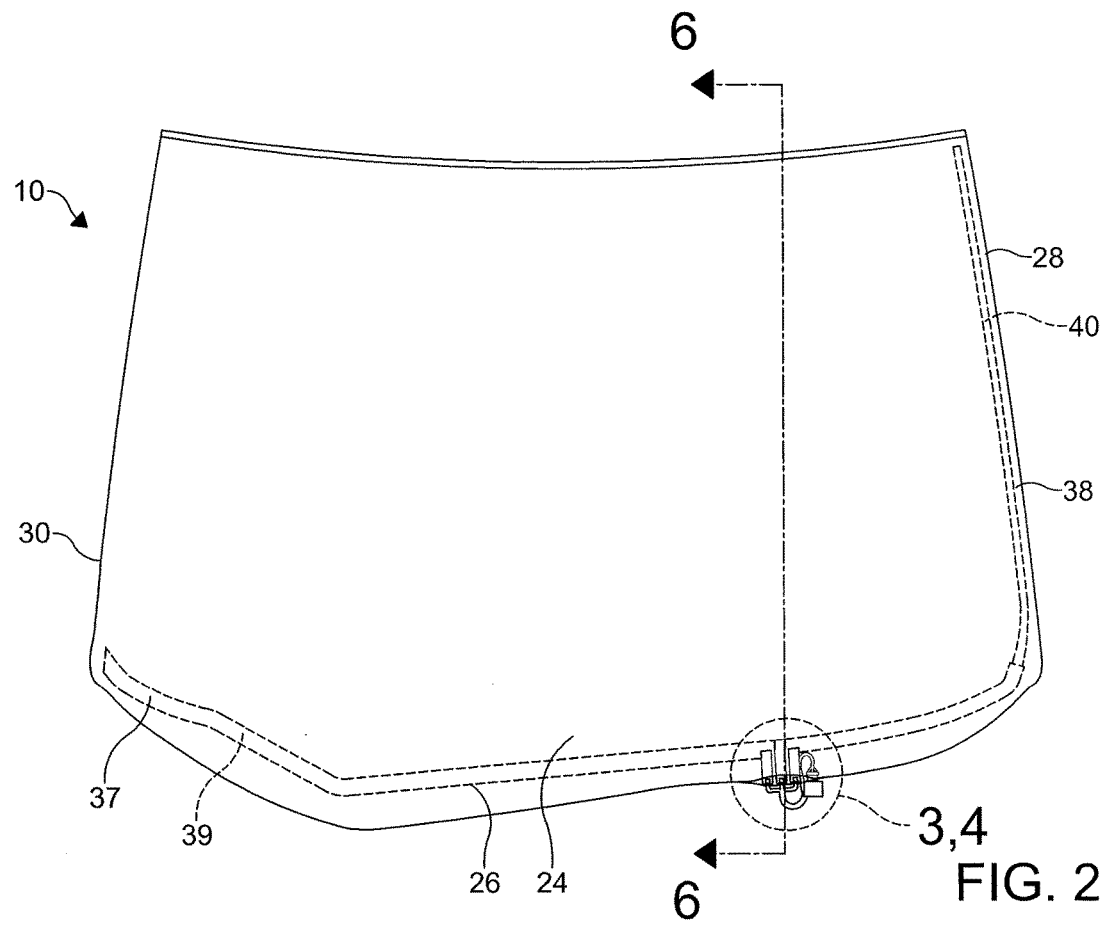
FIG. 2 is a front view of an embodiment of the window assembly of FIG. 1.

The number of conductive traces 36 provided can vary depending on the amount of heating that is desired and the size of the wiper rest area 24. Preferably, the conductive traces 36 are spaced apart from each other and are provided in a grid-like pattern 39, 40. Depending on the size of the wiper rest area 24, a plurality of grid-like patterns may be provided. For example, as shown in FIG. 2, two grid-like patterns 39, 40 are provided to heat the wiper rest area.

Figure 3:
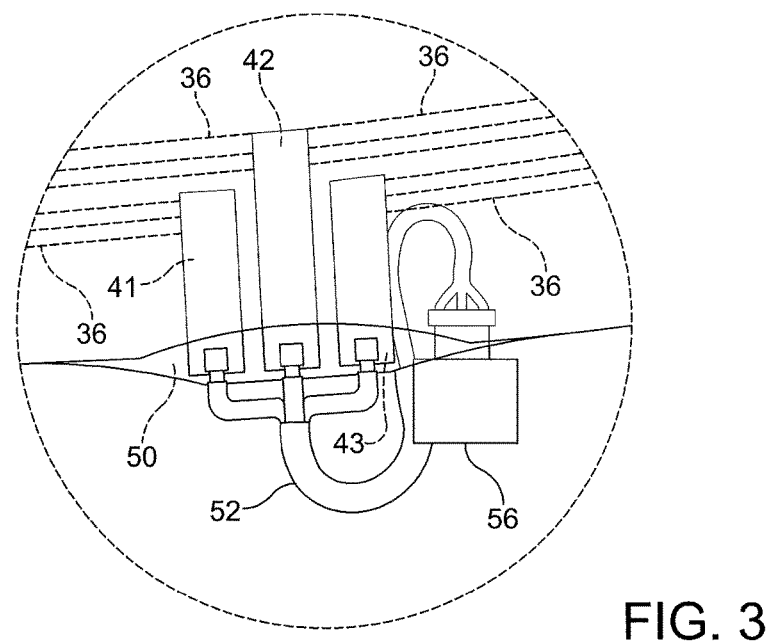
FIG. 3 is an enlarged view of a portion of the window assembly of FIG. 2.
Figure 4:
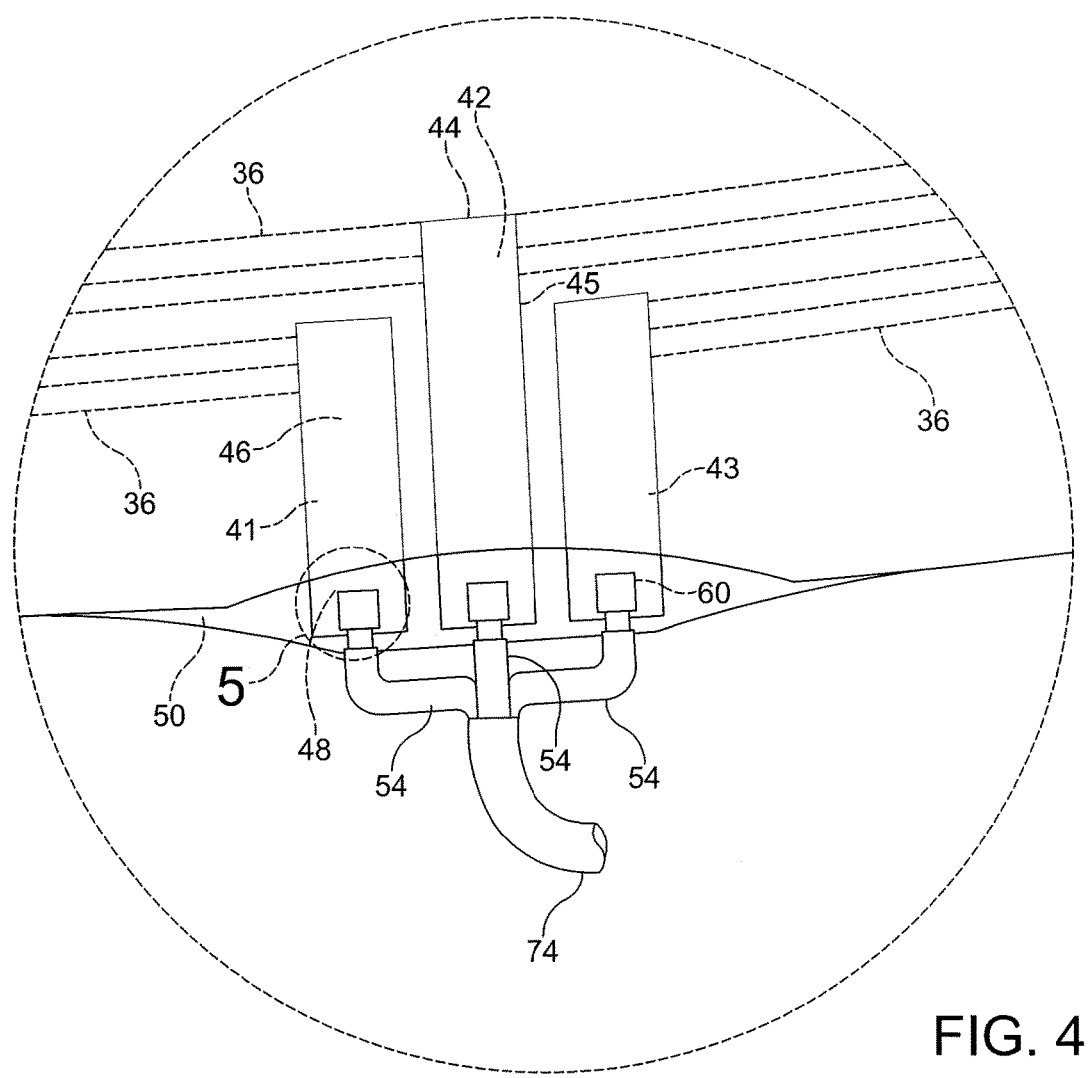
FIG. 4 is an enlarged view of a portion of the window assembly of FIG. 3.

As shown best in FIGS. 3-4, the conductive traces 36 are electrically connected at each end to a busbar 41, 42, 43. In certain embodiments, the conductive traces 36 may be employed in series. However, in other embodiments, the conductive traces may be employed in parallel. As illustrated, each busbar 41, 42, 43 may be provided in a generally perpendicular relationship and formed in a unitary manner with one or more conductive traces 36.

Each busbar 41, 42, 43 is electrically conductive. The busbars 41, 42, 43 can be formed in any manner and from any material which promotes electrical conductance. In certain embodiments, the busbars 41, 42, 43 are formed by the same process and from the same material utilized to form the conductive traces 36. For example, the busbars 41, 42, 43 may be formed by a printing process and from a silver-containing ceramic frit.

As illustrated, a plurality of busbars 41, 42, 43 are provided on the window assembly 10, 10A. The busbars 41, 42, 43 are provided on the same major surface of the inner pane or the outer pane that the conductive traces 36 are provided on. Preferably, the busbars 41, 42, 43 are provided on the second major surface 22, 23 of the inner pane 16 or the outer pane 18. In an embodiment, three busbars 41, 42, 43 are provided on the second major surface 23 of the outer pane 18 of the window assembly 10. Alternatively, as shown best in FIG. 7, three busbars 41, 42, 43 may be disposed on the second major surface 22 of the inner pane 16 of the window assembly 10A. In these embodiments, a center busbar 42 is located between two outer busbars 41, 43. The busbars 41, 42, 43 are arranged on the second major surface 22, 23 of the inner pane 16 or the outer pane 18 in a spaced apart and parallel relationship with each other. The center busbar 42 is electrically connected to each of the outer busbars 41, 43 in, for example, a series circuit via the grid-like patterns 39, 40 of the conductive traces 36.

Figure 5:
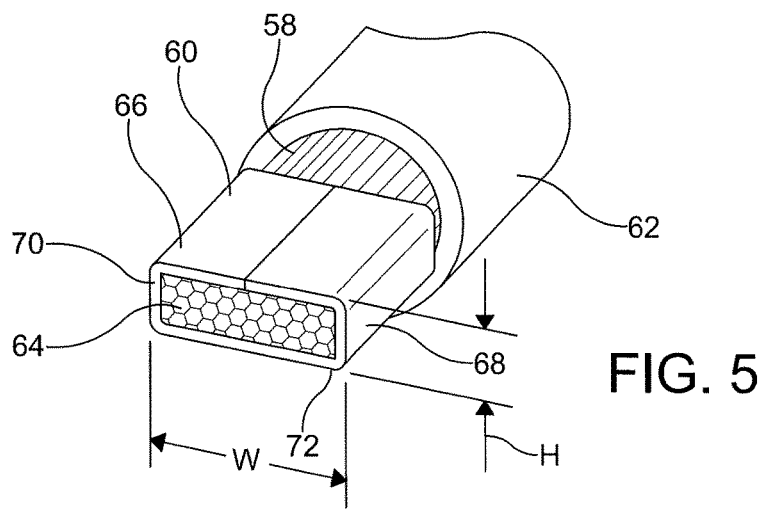
FIG. 5 is a perspective view of a portion of the window assembly of FIG. 4.

Each busbar 41, 42, 43 is of a width 44 and a length 45. As shown best in FIG. 5, the widths 44 of the busbars 41, 42, 43 may be substantially similar. Preferably, the width 44 of each busbar 41, 42, 43 is selected to minimize the heat generated from the busbars 41, 42, 43 as electrical current travels through them. Thus, the width 44 of each busbar 41, 42, 43 is preferably greater than the widths of the conductive traces 36 connected to it. In certain embodiments like those illustrated in FIGS. 2-5, each busbar 41, 42, 43 is of a length 45 such that a first portion 46 of each busbar 41, 42, 43 is disposed between the second major surface 23 of the outer pane 18 and the polymeric interlayer 14. Also, in these embodiments, each busbar 41, 42, 43 is of a length 45 such that a second portion 48 of each busbar 41, 42, 43 extends into a cutout portion 50 of the window assembly 10. The second portion 48 of each busbar is utilized to electrically connect the busbar 41, 42, 43 to a connector assembly 52.

As shown best in FIGS. 3-4, the connector assembly 52 comprises a plurality of wire assemblies 54 and a wire connector 56. The wire connector 56 allows a supply (not depicted) of electrical power to be communicated to the connector assembly 52. Each wire assembly 54 comprises an electrically conductive wire 58 and a terminal connector 60 attached thereto. On an end, each wire assembly 54 via the conductive wire 58 is electrically connected to the wire connector 56. On an opposite end, each wire assembly 54 via the terminal connector 60 is electrically connected to a busbar 41, 42, 43. Electrical power is communicated from the supply to the wire connector 56 and from the wire connector 56 to the wire assemblies 54. Electrical power is communicated from the wire assemblies 54 through the conductive wires 58 and terminal connectors 60 to the busbars 41, 42, 43 and from the busbars 41, 42, 43 to the conductive traces 36 to heat the wiper rest area 24 to a desired temperature.

Preferably, each conductive wire 58 is flexible to allow the wires to extend in and through a space 61 that remains after installation of the window assembly 10, 10A in the body opening 32 of the vehicle 12. For example, as shown best in FIGS. 6-7, the conductive wires 58 extend in and through the space 61 around a molding member 63. In these embodiments, each wire 58 separates a portion of the molding member 63 from sheet metal 65 which at least partially defines the body opening 32.

Preferably, a major portion of each conductive wire 58 is covered by an insulating sheath 62. The insulating sheath 62 prevents the conductive wire 58 from communicating electrical power to an undesired portion of the vehicle 12 such as an electrically conductive portion of the vehicle adjacent the window assembly 10, 10A. A portion of the vehicle which is undesirable to communicate electrical power to and is adjacent the window assembly 10, 10A after installation is, for example, the sheet metal 65 which at least partially defines the vehicle body opening 32. An unsheathed or exposed portion 64 of each conductive wire 58 is attached in a robust manner to a terminal connector 60 adjacent an end of the wire 58. Preferably, the terminal connectors 60 are attached to the exposed portions 64 of the conductive wires 58 mechanically such as, for example, by a crimping process. However, other methods of attaching the terminal connectors 60 to the exposed portions 64 of the conductive wires 58 may be utilized to form the wire assemblies 54.

Each terminal connector 60 comprises a cap portion 66. The cap portion 66 is attached to a pair of sidewalls 68, 70 disposed on opposite sides thereof. Preferably, the sidewalls 68, 70 are in a generally parallel relationship with each other. The sidewalls 68, 70 are attached to the cap portion 66 and a base portion 72. Preferably, the sidewalls 68, 70 are in a generally perpendicular relationship with the cap portion 66 and the base portion 72. The exposed portion 64 of the conductive wire 58 separates the sidewalls 68, 70 from each other and the cap portion 66 from the base portion 72. Preferably, the cap portion 66 and the base portion 72 are in a generally parallel relationship with each other.

As noted above, each wire assembly 54 is electrically connected to a busbar 41, 42, 43 via the terminal connector 60. In order to electrically connect each wire assembly 54 to a busbar 41, 42, 43, the base portion 72 of each terminal connector 60 is attached to the busbar 41, 42, 43. Preferably, the base portion 72 is attached to the busbar 41, 42, 43 via a soldering method. Soldering methods known in the art are suitable for attaching a base portion 72 to a busbar 41, 42, 43.

The cap portion 66 and base portion 72 of each terminal connector 60 are of substantially equal lengths and widths. However, in certain embodiments (not depicted), the base portion is of a length which is greater than that of the cap portion. In these embodiments, the additional length of the base portion provides additional surface area for attaching the base portion to a busbar.

In an embodiment, the terminal connectors 60 are substantially similar having substantially similar or identical portions and dimensions. Further, in certain embodiments, the terminal connectors 60 are rectangular in cross-section. Of course, variations in the processes utilized to form the wire assembly 54 and terminal connector 60 may lead to portions 66, 68, 70, 72 of the connector 60 being slightly misaligned or deformed. Thus, "rectangular in cross-section" should be understood to mean that the terminal connectors 60 could have portions 66, 68, 70, 72 and/or edges which are somewhat rounded and/or be generally rectangular. Also, it should be appreciated that the terminal connectors 60 could be of another cross-sectional shape.

Each terminal connector has a width W and a height or thickness H. In the embodiments where the terminal connectors 60 are substantially rectangular in cross-section, the width W is the distance between the outside surfaces of the sidewalls 68, 70 and the height H is the distance between the outside surface of the cap portion 66 and the outside surface of the base portion 72. When the cross-section is not rectangular, especially when the cross-section is irregular, the "width" is the widest point of the terminal connector and the "height" is the thickest point of the terminal connector. Preferably, the width W is greater than the height H.

Each terminal connector 60 has a height which allows it to fit into the space 61 provided between a portion of the window assembly 10, 10A and the sheet metal 65 at least partially defining the body opening 32 into which the window assembly 10, 10A is installed. Preferably, each terminal connector 60 has a height of 2.5 mm or less. More preferably, each terminal connector 60 has a height of 2.2 mm or less.

A cylindrical tube member 74 may be disposed around the wire assemblies 54 to maintain the spacing and orientation of the wires 58 relative to each other. The cylindrical tube member 74 is provided between and spaced apart from the wire connector 56 and the terminal connectors 60. Preferably, the cylindrical tube member 74 is made from an insulating material such as, for example, a polymeric material. However, other insulating materials which can be provided in a cylindrical shape and offer a degree of resiliency could also be utilized to form the cylindrical tube member.

Figure 7:
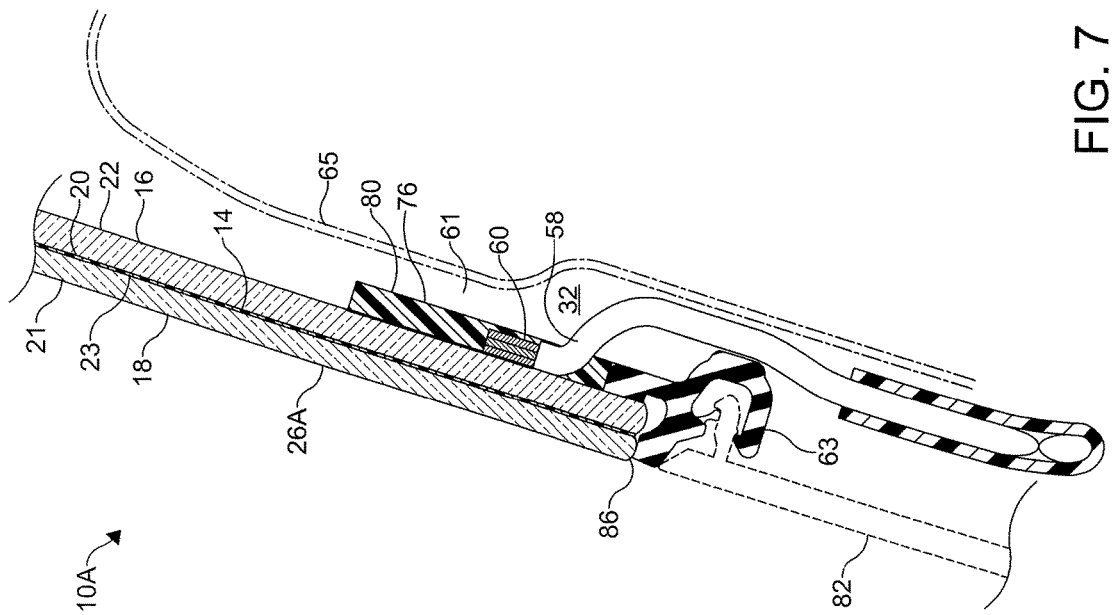
FIG. 7 is a cross-sectional view of another embodiment of the window assembly of FIG. 1.
Figure 6:
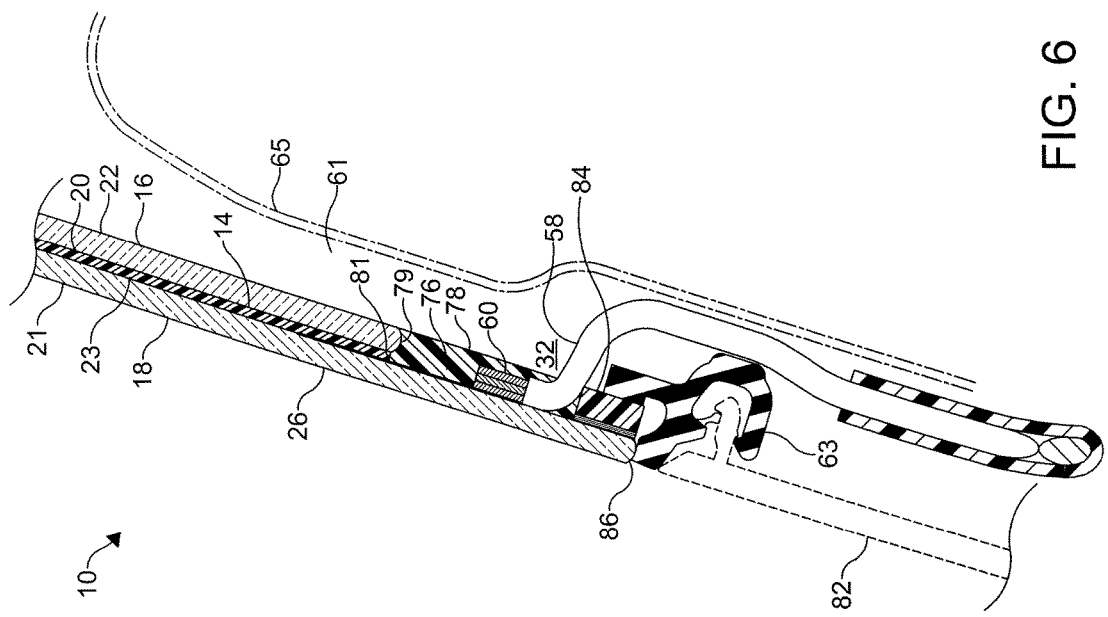
FIG. 6 is a cross-sectional view of the window assembly of FIG. 2 taken along line 6-6.

As best shown in FIGS. 6-7, a potting layer 76 is provided over at least a portion of the busbars 41, 42, 43, each terminal connector 60 and a portion of each conductive wire 58. The potting layer 76 separates the terminal connectors 60 from the sheet metal 65 at least partially defining the body opening 32. Advantageously, the height of each terminal connector 60 is such that the potting layer 76 can be provided over the terminal connectors 60 at a thickness which protects the terminal connectors from environmental damage, electrically insulates the terminal connectors from the aforementioned sheet metal and provides a window assembly with a pleasing appearance. Suitable potting layer materials include acrylics, silicones and urethanes. However, other potting layer materials are suitable for use in forming the window assembly.

Preferably, the potting layer 76 is disposed on the second major surface 22, 23 of the inner pane 16 or the outer pane 18. When the potting layer 76 is provided on the second major surface 23 of the outer pane 18 as is shown in FIG. 6, the potting layer 76 is provided at a thickness such that it forms an inboard surface 78 which does not extend beyond the second major surface 22 of the inner pane 16. Thus, the potting layer 76 and the terminal connectors 60 are of thicknesses that result in a combined thickness that is less than or equal to the combined thickness of the polymeric interlayer 14 and inner pane 16. In this embodiment, it is preferred that the inboard surface 78 formed by the potting layer 76 is aligned with the second major surface 22 of the inner pane 16. When the potting layer 76 is provided on the second major surface 22 of the inner pane 16 as is shown in FIG. 7, the potting layer 76 forms an inboard surface 80 of the window assembly 10A which separates a portion of the second major surface 22 of the inner pane 16 from the sheet metal 65 which partially defines the vehicle body opening 32 into which the window assembly 10A is installed.

As illustrated in FIGS. 2-6, in certain embodiments the window assembly 10 includes the cutout portion 50. In these embodiments, each terminal connector 60 is attached to the second portion 46 of a busbar 41, 42, 43 in the cutout portion 50 and the potting layer 76 is provided thereover in the cutout portion 50. The cutout portion 50 is located proximate a peripheral edge 30 of the window assembly 10. Preferably, the cutout portion 50 is located in the lower edge portion 26 of the window assembly 10. The cutout portion 50 is formed in an edge 79, 81 of the inner pane 16 and polymeric interlayer 14 by removing portions of the inner pane 16 and the polymeric interlayer 14.

The cutout portion 50 can be of any desired shape. For example, the cutout portion 50 could be of a shape which is generally circular, hemispherical, oval, rectangular, square, triangular, or another polygonal shape. However, as shown best in FIG. 3, it may be preferred that the cutout portion 50 is of a generally pointed elliptical, partially elliptical or another generally pointed and/or elliptical shape.

The molding member 63 is disposed around at least a portion of the peripheral edge 30 of the window assembly 10, 10A. Preferably, the molding member 63 is formed from a polymeric material that can be molded onto or otherwise affixed around the peripheral edge 30 of the window assembly 10, 10A. The molding member 63 provides a seal about the body opening 32 of the vehicle 12 that the assembly 10, 10A is installed in. The molding member 63 may be disposed against a water box cover 82 when the window assembly 10, 10A is installed in the body opening 32. In order to achieve an aesthetic appearance, there is very little space left between the molding member 63 and the aforementioned sheet metal 65. Nonetheless, it is desirable to utilize the space 61 to, for example, provide an electrical connection therethrough.

In certain embodiments, a spacer 84 may be provided in the cutout portion 50 along a lower edge 86 of the outer pane 18. The spacer 84 provides an inboard surface for attaching a portion of the molding member 63 to the window assembly 10. The spacer 84 is attached to the window assembly 10 via bonding to the second major surface 23 of the outer pane 18. Bonding the spacer 84 to the second major surface 23 of the outer pane 18 can be achieved via an adhesive or another suitable method.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A window assembly, comprising:
   a polymeric interlayer provided between an inner pane of glass and an outer pane of glass, the inner pane and outer pane each have a first major surface and a second major surface, wherein the second major surface of the outer pane and the first major surface of the inner pane face each other;
   a connector assembly having a wire assembly, the wire assembly comprising a wire and a terminal connector, the wire has an unsheathed portion and the terminal connector is attached to the unsheathed portion, the terminal connector comprising a pair of sidewalls which are separated from each other by the unsheathed portion of the wire, wherein the terminal connector has a width and a height, the width being greater than the height, and the terminal connector is also attached to a busbar provided on the second major surface of either the inner pane or the outer pane; and
   a potting layer provided over the terminal connector.

2. The window assembly defined in claim 1, wherein the potting layer is provided over the entire terminal connector and wherein the potting layer comprises an electrically insulating material.

3. The window assembly defined in claim 1, further comprising a wiper rest area provided on the first major surface of the outer pane.

4. The window assembly defined in claim 2, wherein the connector assembly has a plurality of wire assemblies and each wire assembly comprises a terminal connector, wherein the potting layer is provided entirely over each terminal connector.

5. The window assembly defined in claim 1, wherein the busbar is attached to a plurality of electrically conductive traces which extend along one or more edge portions of either the inner pane or the outer pane.

6. The window assembly defined in claim 1, wherein the window assembly is disposed in a body opening of a vehicle.

7. The window assembly defined in claim 1, wherein the terminal connector comprises a pair of sidewalls which are provided in a generally parallel relationship with each other.

8. The window assembly defined in claim 5, wherein the busbar and plurality of electrically conductive traces are formed in a unitary manner and of silver-containing ceramic frit.

9. The window assembly defined in claim 7, wherein the terminal connector is substantially rectangular in cross-section.

10. The window assembly of claim 1, wherein the terminal connector comprises a base portion and a cap portion, the base portion being attached to the busbar and separated from the cap portion by the unsheathed portion of the wire.

11. The window assembly of claim 10, wherein the terminal connector further comprises a pair of sidewalls and each sidewall of the pair of sidewalls is attached to the base portion and the cap portion.

12. A window assembly, comprising:
a polymeric interlayer provided between an inner pane of glass and an outer pane of glass, the inner pane and outer pane each have a first major surface and a second major surface, wherein the second major surface of the outer pane and the first major surface of the inner pane face each other;
a connector assembly having a wire assembly, the wire assembly comprising a wire and a terminal connector, the wire has an unsheathed portion and the terminal connector is attached to the unsheathed portion, the terminal connector comprising a pair of sidewalls which are separated from each other by the unsheathed portion of the wire, wherein the terminal connector has a width and a height, the width being greater than the height, and the terminal connector is also attached to a busbar provided on the second major surface of the outer pane; and
a potting layer provided over the terminal connector, wherein the potting layer forms an inboard surface which does not extend beyond the second major surface of the inner pane.

13. The window assembly defined in claim 12, further comprising a cutout portion located proximate a peripheral edge of the assembly and formed in an edge portion of the inner pane and the polymeric interlayer.

14. The window assembly defined in claim 12, wherein the terminal connector is of a thickness which is 2.5 mm or less.

15. The window assembly defined in claim 12, wherein the potting layer is formed of a urethane material.

16. The window assembly defined in claim 12, wherein the potting layer comprises an electrically insulating material.

17. The window assembly defined in claim 12, wherein the terminal connector is mechanically attached to the unsheathed portion of the wire.

18. The window assembly defined in claim 12, wherein the connector assembly has a plurality of wire assemblies and each wire assembly comprises a terminal connector, wherein the potting layer is provided entirely over each terminal connector and each terminal connector is attached to a busbar formed on the second major surface of the outer pane.

19. The window assembly defined in claim 12, wherein the inboard surface formed by the potting layer is aligned with the second major surface of the inner pane.

20. The window assembly defined in claim 13, further comprising a polymeric molding member disposed around at least a portion of the peripheral edge of the assembly.

21. The window assembly defined in claim 13, wherein a portion of the busbar is located in the cutout portion.

22. The window assembly defined in claim 13, wherein the potting layer is provided in the cutout portion.

23. A window assembly, comprising:
a polymeric interlayer provided between an inner pane of glass and an outer pane of glass, the inner pane and outer pane each have a first major surface and a second major surface, wherein the second major surface of the outer pane and the first major surface of the inner pane face each other;
a connector assembly having a wire assembly, the wire assembly comprising a wire and a terminal connector, the wire has an unsheathed portion and the terminal connector is attached to the unsheathed portion, the terminal connector comprising a base portion and a cap portion, the base portion being attached to a busbar and separated from the cap portion by the unsheathed portion of the wire, the busbar being provided on the second major surface of either the inner pane or the outer pane, wherein the terminal connector has a width and a height, the width being greater than the height; and
a potting layer provided over the terminal connector.

24. A window assembly, comprising:
a polymeric interlayer provided between an inner pane of glass and an outer pane of glass, the inner pane and outer pane each have a first major surface and a second major surface, wherein the second major surface of the outer pane and the first major surface of the inner pane face each other;
a connector assembly having a wire assembly, the wire assembly comprising a wire and a terminal connector, the wire has an unsheathed portion and the terminal connector is attached to the unsheathed portion, the terminal connector comprising a base portion and a cap portion, the base portion being attached to a busbar and separated from the cap portion by the unsheathed portion of the wire, the busbar being provided on the second major surface of the outer pane, wherein the terminal connector has a width and a height, the width being greater than the height; and
a potting layer provided over the terminal connector, wherein the potting layer forms an inboard surface which does not extend beyond the second major surface of the inner pane.

25. The window assembly of claim 1, wherein the terminal connector comprises a base portion and a cap portion, the cap portion having a first portion and a second portion, the first portion extending from a first sidewall of the pair of sidewalls to a first portion end and the second portion extending from a second sidewall of the pair of sidewalls to a second portion end, the first portion end provided adjacent the second portion end.

* * * * *